Oct. 6, 1925. 1,555,941
A. CAPROTTI
VALVE GEAR FOR ELASTIC FLUID ENGINES
Filed July 14, 1920 3 Sheets-Sheet 1

Inventor
A. Caprotti,
By H. R. Kerslake
Atty.

Oct. 6, 1925.
A. CAPROTTI
1,555,941
VALVE GEAR FOR ELASTIC FLUID ENGINES
Filed July 14, 1920     3 Sheets-Sheet 2
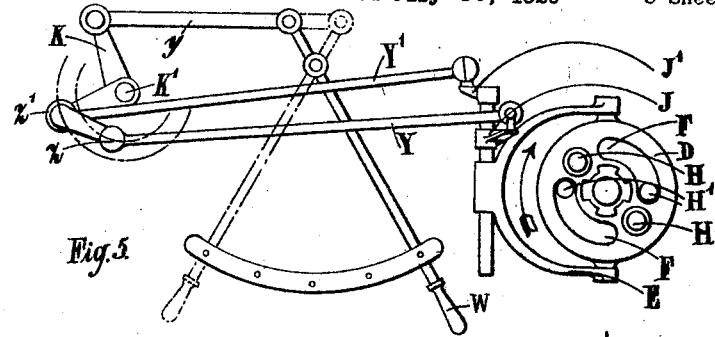
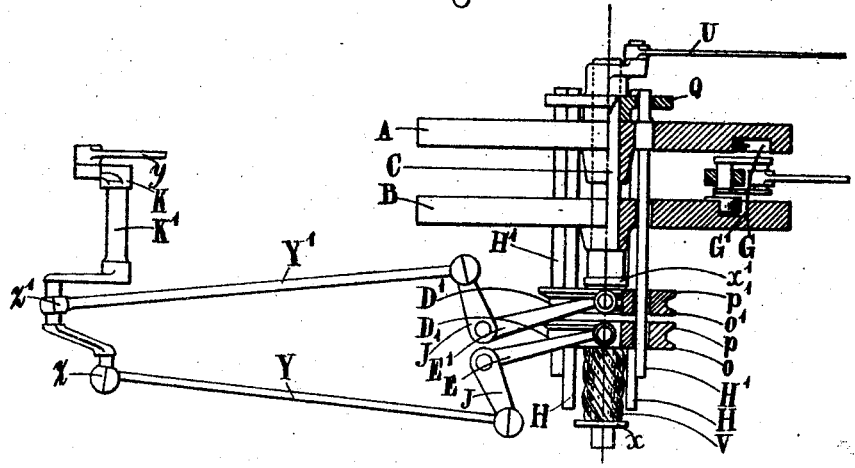
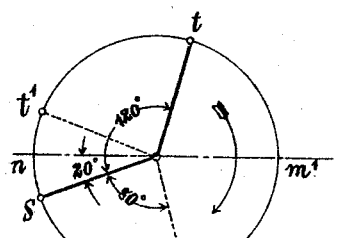
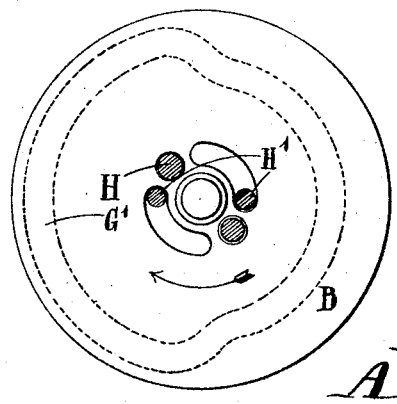
Inventor
A. Caprotti,
By H. R. Kerslake.
Atty.

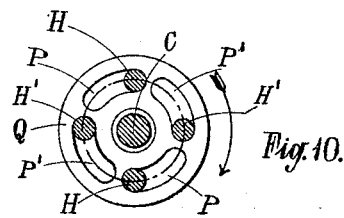
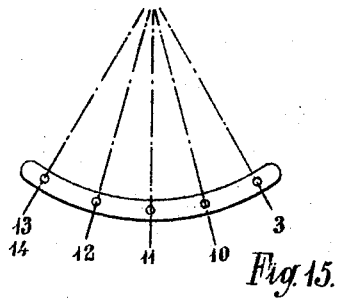
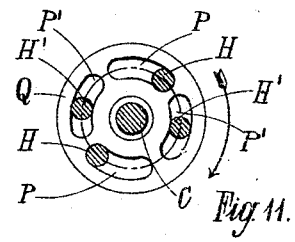
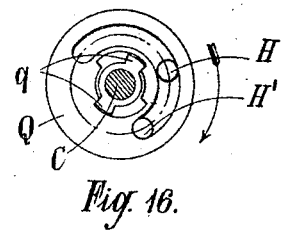
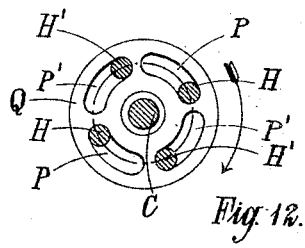
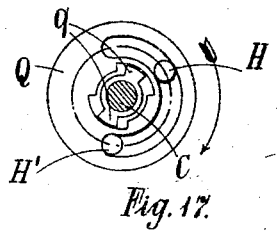
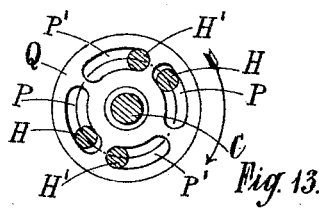
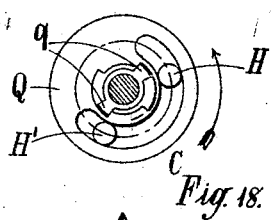
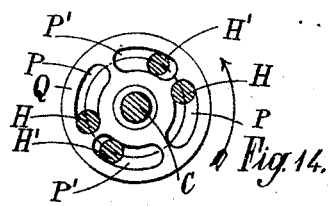
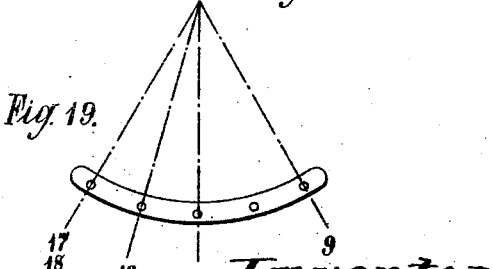

Patented Oct. 6, 1925.

1,555,941

UNITED STATES PATENT OFFICE.

ARTURO CAPROTTI, OF MILAN, ITALY.

VALVE GEAR FOR ELASTIC-FLUID ENGINES.

Application filed July 14, 1920. Serial No. 396,273.

(GRANTED UNDER THE PROVISIONS OF THE ACT OF MARCH 3, 1921, 41 STAT. L., 1313.)

*To all whom it may concern:*

Be it known that I, ARTURO CAPROTTI, a subject of the King of Italy, residing at Pergolese No. 2, Milan, Italy, have invented certain new and useful Improvements in Valve Gears for Elastic-Fluid Engines (for which I have filed applications in Italy July 15, 1916, Patent No. 155,227, and Dec. 20, 1916, Patent No. 157,438), of which the following is a specification.

This invention relates to valve gear for elastic-fluid engines of the type, wherein the operations for opening and closing each valve can be effected by separate mechanisms one of which serves for effecting the opening only and the other the closing only of the valve port. The object of the present invention is to provide suitable controlling gear whereby the two mechanisms (for opening and closing) may both be adjusted, sometimes separately, and sometimes in a determined combination.

The improved valve gear is particularly advantageous in its application to piston engines working with steam or compressed air and of the reversing type, but it is also applicable with advantage to any other type of elastic-fluid engine working in a periodic cycle.

The drawings diagrammatically illustrate a constructional form of valve gear, according to the present invention, applied to an engine having a double acting cylinder with four valves.

Figure 1:
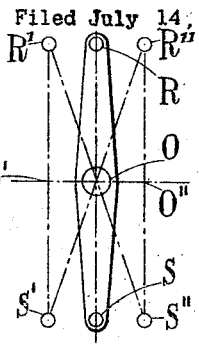
Figure 4:
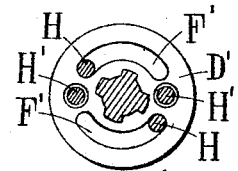
Figure 2:
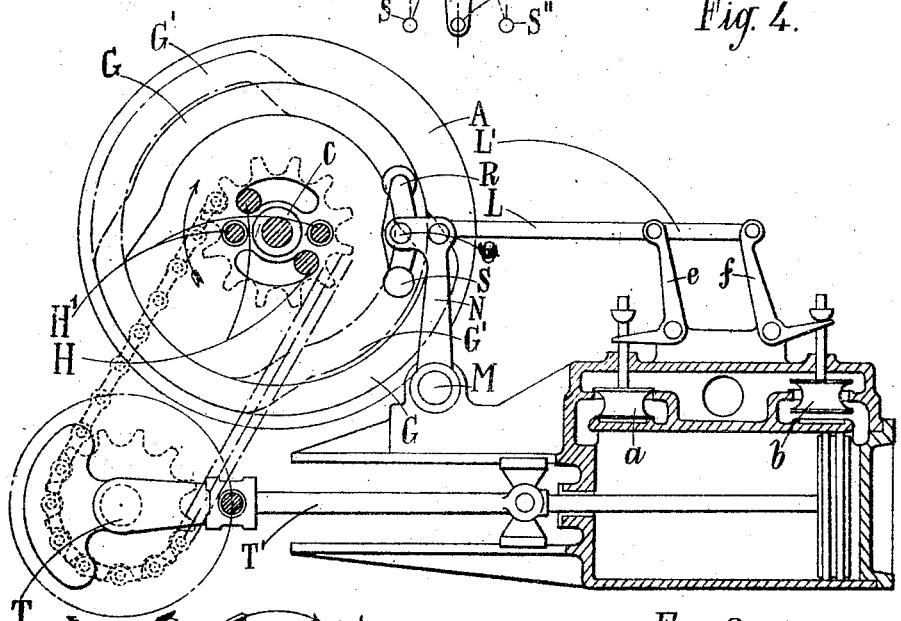
Figure 3:
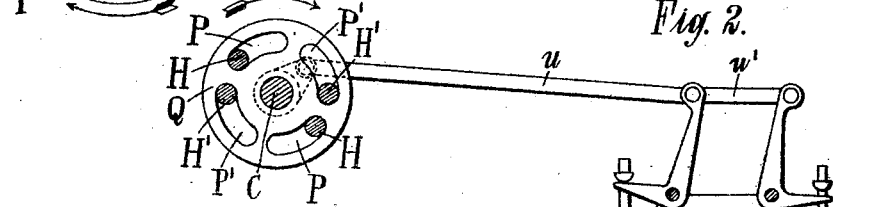

Fig. 1 indicates four different positions for the rocking beam shown in Fig. 2,

Fig. 2 shows the mechanism for actuating the inlet valves of the engine, including the rocking beam hereinbefore referred to, Fig. 3 shows the mechanism for actuating the exhaust valves of the engine, including a rotating disc actuating these exhaust valves, Fig. 4 shows one of the grooved sleeves driving the valve mechanism in Figs. 2 and 3, Fig. 5 shows a side view of an arrangement for simultaneously controlling the mechanisms shown in Fig. 2 and Fig. 3 respectively and includes a reversing lever, Fig. 6 is a plan of the arrangement shown in Fig. 5, Fig. 7 is a detail view of a cam shown in Fig. 2, Fig. 8 is a diagram illustrating the operation of one of the exhaust valves of the engine, Fig. 9 shows an alternative construction for the rotating disc in Fig. 3, Figs. 10 to 14 show different positions of the rotating disc shown in Fig. 3, and its controlling rods, corresponding to different positions of the reversing lever in Fig. 5, Fig. 15 indicates the various positions of the reversing lever corresponding to Figs. 3 and 10 to 14, Figs. 16 to 18 show different positions of the alternative form of rotating disc shown in Fig. 9, corresponding to different positions of the reversing lever in Fig. 5, Fig. 19 indicates the various positions of the reversing lever corresponding to Figs. 9 and 16 to 18.

In Fig. 2, $a$ and $b$ are the two inlet valves which are separate from the exhaust valves $c$ and $d$ shown in Fig. 3.

The operation of the inlet valves is produced by means of bell crank levers $e$ and $f$ and a rod L L′ terminating at a lever N fulcrumed at the point M and carrying a rocking beam R S fulcrumed at O.

The operation of the inlet valves in the present improved valve gear is obtained by the movements imparted to the beam R S by the two cams A and B (Figs. 2 and 6) acting, the one upon the roller R, and the second one upon the roller S of the beam R S.

The contours of the cams are similar to each other and are constituted each by two circular arcs of the same angular extent but of different radii, connected together at diametrally opposite points. The cams may have the shape shown in the drawings, with the grooves G (in the cam A) and G′ (in the cam B), in which engage the rollers R and S, or they may have the shape of ordinary cams with which the rollers R and S are held in contact by a spring or other equivalent means.

Fig. 1 of the drawings illustrates diagrammatically the different positions R′ S′, R′ S″, R″ S″ and R″ S′ which the rocking beam R S will assume successively during the revolution of the cams, dwelling for a certain period in each of the said positions.

The cams A and B are loose on the shaft C which rotates with the same angular speed as the driving shaft T of the engine.

In the drawings T' is the connecting rod of the engine driving the shaft T, which in its turn drives the shaft C through chain gearing as diagrammatically indicated in Fig. 2.

On the shaft C there is fixed a quick-pitch screw V on which screw the two grooved sleeves D and D' (see Figs. 4, 5 and 6). The sleeves D and D' are connected respectively to the two cams B and A by pairs of rods H and H' in such a manner that the axial shifting of the sleeves will produce an angular displacement of the cams that are connected respectively to them.

The two cams A and B are, furthermore, shifted angularly relatively to each other when the two grooved sleeves are moved nearer to or away from each other. This is a necessary feature and is produced by two crank rod mechanisms whereof the two driving cranks Z and Z' (Figs. 5 and 6) are keyed approximately 90° apart on one and the same shaft K' which is operated by the engine driver from the hand lever W, operating through a connecting rod $y$, and a lever K, while the connecting rods Y, Y' attached to the cranks Z, Z' respectively move levers J and J' which move other levers E and E' of fork shape acting upon the sleeves D and D'. According to the positions of the two crank pins Z and Z' relatively to the dead centre, the distance between the two sleeves is varied, and consequently the respective angular distance apart of the two cams.

In order that the sleeve D' connected to the cam A by the pair of rods H' shall be able to shift the cam independently of the angle of the cam B, it is necessary that the latter as well as the sleeve D connected to it by the rods H, shall be formed with slots of sufficient amplitude as shown in Figs. 5 and 7. Vice versa and for the same purpose, similar slots are provided in the cam A and its sleeve D'.

As a matter of fact, the valves $a$ and $b$ are connected to the beam R—O—S in such a manner that when the centre of this beam is in its mid position, both valves are closed, and the valve $b$ will open only when the centre O of the said beam R—O—S has moved towards O', whereas the valve $a$ will open only when the said centre moves towards O'' (see Figs. 1 and 2). Thus when O is to the left of its centre position, the valve $a$ is closed, resting on its seating and is out of contact with the lever $e$, which moves idly, as shown Fig. 2.

The shape of the cams A and B and the adjustment possible in the angular distance apart of the cams are such that in all cases, during the forward motion of the engine, the cam A will move O out of its mid position either towards O' or towards O'', that is to say, it will open the valves, whereas the cam B will return the point O into its mid position, that is to say, will close the valves. During backward motion of the engine, since the operation of opening becomes that of closing and vice versa, the cam A alone will effect the closing, and the cam B alone will effect the opening.

The object of the angular shifting apart of the two cams A and B is to accelerate or to retard the times of opening or closing the valves $a$ and $b$, that is to say, to vary the cut-off and the lead in relation to the desired working, or to reverse the direction of drive of the engine.

This is possible because during the forward running of the engine, on account of the described form of the cams and of the manner of controlling the valves by means of the beam R—O—S, the cam A alone effects the opening of the two valves, whereas the cam B alone effects the closing thereof.

The regulation of the engine and the reversal of the drive will then take place in the following manner:

Assuming that the drawings (Figs. 2, 3, 5, 6) illustrate the valve gear adjusted for latest time of cut-off for forward running, then by the movement of the lever K towards the right (which movement is effected by moving the hand lever W towards the left), the crank pin Z which is far from the dead centre, will through the medium of the parts J, E, D and H, give an advance to the motion of the cam B, that is to say, will accelerate the closing of the valves, whereas the second crank pin Z' being near the dead centre, will produce only small movements of the corresponding cam A, that is to say, the opening of the valves will be scarcely varied at all.

In the continuation of the movement of the lever K, the crank pin Z will move nearer to its dead centre, and the rate of increase of advance of the cam B will be reduced, whereas the crank pin Z' will move through and beyond its dead centre and thus impart to the cam A an advance whose rate of increase is itself an increasing quantity. Under these conditions the cut-off will vary less rapidly, whereas there will always be a more appreciable variation of advance in the opening, that is to say, the point of admission of steam to the cylinder will occur earlier.

The mechanism is approximately symmetrical, and thus then when the lever K is in its extreme right-hand position, the crank pin Z will be situated near its dead centre, whereas the crank pin Z' will be distant from it, and the engine will run with maximum steam lead or countersteam, and with a very early cut-off.

On account of its symmetry, at the reversal of the motion of the engine, the high amount of lead during the forward travel will become a late time of cut-off in rearward travel, and by moving the lever K towards the left the engine will be regulated in the same manner as described for forward travel.

Owing to the connecting rods Y, Y' that are diagrammatically shown in Figs. 5 and 6, there corresponds for each position of the lever K, a single and well defined position of the cams A and B, and to each displacement of the said lever K there corresponds always a certain amount of rotation of each of the two cams A and B relatively to the cam shaft C. It may however be useful to keep the opening cam stationary during the rotation of the lever K corresponding to the passage from the late to an early time of cut-off. For this purpose, as will be shown, it will be sufficient to provide a determined amount of play in each connecting mechanism, for instance, between the ends of the forked levers E and E' and the edges o, p, o' and p' of the sleeves D and D', and to provide stop rings x and x' at the ends of the screw V.

Since the cams A and B offer resistance to rotation then, during the forward motion of the engine, (indicated by the arrow in Fig. 5), the cams themselves through the medium of rods H' and H, will compel the sleeves D' and D to bear with their sides o' and o against the ends of the corresponding levers E' and E (the direction of the screw thread V being as indicated in Fig. 6).

Neglecting the effect of the ring x' and provided that the said resistance of the cams to rotation does not at any instant become negative and of sufficient amount to overcome the resistances that oppose the movement of the sides o' and o from the ends of the levers E' and E, then the setting of the valve gear when the engine runs in the direction of the arrow will be the same as if there were no play between the ends of the levers E' and E and the sides p' and p, of the sleeves D' and D.

The ring x' limits the travel of the sleeve D' and prevents it from moving longitudinally when the lever E' is situated near the said ring, which happens when the pin Z' is moving in the neighbourhood of its dead centre. The ends of the lever E' will then move away from the side o' and the sleeve will remain bearing against the ring x'.

If it were desired to keep the opening cam A stationary during a rotation of 50 degrees of the crank Z', it would obviously be sufficient to arrange the distance between the sides o' and p' and the position of the stop ring x' in such a manner that when Z' is on its dead centre, and the sleeve D' is bearing against the ring x', the ends of the forked lever E' will be situated near the side p', and there will be between the side o' and the ends of the lever E' an amount of play corresponding to a rotation through 25 degrees of the crank Z' from its dead centre. In this case, assuming that there is 110° shift of the cam B in respect to the cam shaft C corresponding to the entire travel of the reversing lever through say 120°, from latest cut off in forward running to latest cut-off in backward running, or its equivalent greatest amount of lead in forward running, then during the first 50 degrees of the movement of the lever K, the opening cam will remain stationary, and only just before the mid position of the lever K, that is to say, for early times of cut-off, will the opening cam be advanced in order to give increased lead and prepare for reversing.

The ring x is arranged relatively to the sleeve D in the same manner as is the ring x' relatively to the sleeve D', and the distance between the sides o and p is approximately equal to the distance between the sides o' and p'. In this way, the operation will be analogous after reversal of the motion, and the cam B which will then become the opening cam, will remain stationary from the latest to the early times of cut-off. On reversal of motion the sleeves D and D' will bear with their sides p and p' against the ends of the corresponding levers E and E'.

For actuating the exhaust valves it will be sufficient to adopt an ordinary actuating mechanism comprising a single cam or crank which is caused to lead or to lag as required relatively to the crank shaft in relation to the desired direction of motion. The angular extent of the exhaust will then be constant, but the operation will nevertheless be satisfactory.

Figs. 3 and 6 illustrate diagrammatically a mechanism for actuating the valves c and d by means of a crank (or eccentric) and a jointed connecting rod U, U, and by which the two valves are closed when the crank is vertical, and the left hand valve c is alone open when the crank is on the right hand side, whereas the other valve d is open when the crank is on the left hand side. The crank may with advantage be replaced by a cam. By this means it is possible to obtain a graduated opening and closing of the valves in a direct manner without having recourse to any of the well known intermediate devices that effect this purpose and are necessary when eccentrics or cranks are used.

By mounting the exhaust cam (or crank) loose on the shaft C (Figs. 3 and 6), the said cam may receive the rotary motion from the shaft C either by means of fingers or tappets fixed thereon, or from the opening cam or the closing cam operating the inlet valves. By such an arrangement the various angular shifting movements of the cams of the inlet valves may be utilized to cause the exhaust cam to be shifted angularly and successively by one or the other of the inlet cams according to any desired law. Figs. 3, 10, 11, 12 and 13 illustrate the succession of these shifts during a complete reversal of the reversing lever.

In the apparatus illustrated in Figs. 3 and 6, the exhaust cam is coupled to a disc Q formed with apertures P and P' in which engage the ends of the rods H and H' connected to the inlet cams B and A. The position and angular width of these apertures are so selected that the disc Q is driven by one or other of the pairs of rods H and H' according to the setting of the mechanism controlling the inlet valves, the exhaust cam being thus uncoupled from one or other of the inlet cams B or A.

If, for example, the engine under consideration is a locomotive, the duration of the exhaust may be assumed to be about 120 degrees, and at the late and medium times of cut-off it may begin when the crank of the engine main-shaft is at $s$ (Fig. 8) 20 degrees before the crank reaches the dead centre $m$, and finish at $t$ 80 degrees before the other dead centre $m'$.

Assuming further that in this locomotive the clearance volume of the working cylinder is small or the boiler pressure is not very high, then for early points of cut-off occurring when the piston has completed about 10% of its power stroke, the final pressure of expansion will be less than the atmospheric pressure, and it is necessary that, before reaching these early points of cut-off the exhaust cam shall be advanced so as to occur earlier in the stroke so as to limit the expansion to a pressure higher than atmospheric pressure.

This advance must be increased when the engine is working with high steam lead, in order to avoid the exhaust valve being still open at the time of opening the inlet valve, and it must attain such a value that on the reversal of motion of the engine to full steam backwards, the exhaust angle $t'$—$S'$ (Fig. 8) will be symmetrical (relatively to the line of the dead centres $m$ $m'$) with the exhaust angle $S'$—$t$ for forward running, that is to say the exhaust angle $t'$—$S'$ will be suitable for backward running (see dotted lines Fig. 8).

The total angular shifting, i. e. the angle between S and S', should be about 80 degrees, and during the rearward travel in the direction contrary to that of the arrow, the exhaust will begin at $t'$ and end at S'.

With the latest time of cut-off that is with the mechanism in the position shown in Figs. 3, 5 and 6, the disc Q (Fig. 3) is actuated in the forward direction of motion of the engine by the rods H' which are situated at the ends of the apertures P', whereas the rods H are inoperative, since they are situated at the relatively opposite ends of the apertures P, that is to say, towards the direction opposed to the direction of motion.

Since when causing the cut-off to occur earlier, the rods H are advanced relatively to the rods H', the latter will alone actuate the disc Q up to the time when the cut-off occurs so early that the rods H after having traversed inactively the entire aperture P, will themselves also actuate Q (see Fig. 10). During this first period corresponding to the rotation of the crank Z' (Fig. 5) near the left hand dead centre, the disc Q operating the exhaust will have been almost fixed, in the same manner as in the case of the opening cam A for the inlet valves by which it has been actuated.

In the next step in the operation of the reversing lever W, corresponding to points of early cut-off, the rods H will continue to advance relatively to the rods H', and consequently the rods H alone will actuate the disc Q (see Fig. 11), whereas the rods H' will traverse the apertures P' in the direction opposed to the rotation of the shaft C. This advance of the disc Q relative to the rods H' will begin when the time of cut-off is later or earlier according to the lesser or greater angular width of the apertures P, and this angular width will be made such as to limit the expansion in the cylinder to any desired degree.

For a certain setting of the reversing lever W, corresponding to the engine being retarded by back steam to a small extent, the pins Z and Z' will have moved in such a manner, namely, the former nearer to its dead centre and the latter further away from its dead centre, that the relative motion of the rods H and H' will be reversed, and after that the rods H' will continue to move within the apertures P' but this time in the direction of motion of the shaft C. The disc Q will continue to be actuated by the rods H up to the end of the movement of the rods H' in the apertures P', that is to say, up to the moment when both rods H and H' will, for an instant, drive the disc Q (as in Fig. 12). From this position up to the end of the movement of the reversing lever, since the relative movement of the rods H and H' will continue, it is the latter rod, namely the cam A, which will begin again to actuate the disc Q, as in the first phase of the reversing lever, whereas the rod H will lag relatively to the disc Q and move within its aperture P in the direction contrary to the rotation of the disc Q until it reaches a point very near to the end of the said aperture (see Fig. 13).

When the reversing lever is completely reversed, that is to say, for the maximum amount of back-steam, the engine being here presumed to be moving forwards but driving backwards so that the engine acts as a brake, the disc Q will have advanced though a total angle in the forward direction of motion of the engine exactly equal to the advance of the rods H'. Since this advance corresponds to the advance of the cam A for the opening of the inlet valve, the angular extent of the compression phase comprised between the instant of closing the exhaust and the instant of opening the inlet valve, will be exactly the same for the high amounts of back-steam and for the late points of cut-off and all danger of simultaneous opening of the inlet and exhaust valves will be avoided.

Fig. 14 shows how, on reversing the motion of the actuating shaft C, the rod H takes up the drive of the disc Q after having gone through a small angle from its initial position to the end of the aperture P to take up the slight amount of play existing. Fig. 15 shows the reversing lever in the various positions, whose numbers correspond to the numbers of the aforesaid figures.

Assume for the sake of example that the clearance volume of the working cylinder is about 10% and that the pressure in the boiler is about 170 lbs. per square inch. In such a case even for the earliest practical times of cut-off, occurring (say) when the piston has completed about 6 to 8% of its power stroke the final pressure of expansion in the cylinder will not be lower than the atmospheric pressure, and it would not be at all necessary to advance the disc Q operating the exhaust for early times of cut-off. It will then be sufficient for the disc Q to be normally actuated by tappets $q$ fixed on the shaft C (Fig. 9), and for the disc itself to have a single open aperture as shown in that figure.

In this aperture there engage the end H' of one only of the two rods belonging to the cam A, as also the end H of one of the rods fixed to the cam B.

In this latter case, when the disc Q is actuated by the tappets $q$, then during the motion in the direction of the arrow that is for the forward running of the engine, from early points of cut-off up to a certain definite increase in the steam lead, it will always be the tappets $q$ that will actuate the disc Q. The rod H, that is to say, the closing cam of the inlet valve will never be able to actuate the exhaust cam or crank Q, whatever the manner of running may be. Only when the opening cam A of the inlet valve that is the cam controlling the steam lead shall have advanced by about 60° will the rod H' take over the actuation and advance the disc Q operating the exhaust which will consequently become independent of the tappets $q$ and by its advance will prevent simultaneous opening of the exhaust and inlet valves at high amounts of back-steam.

Figs. 16 and 17 and 18 represent different successive positions of this mechanism corresponding to reversing lever positions of same numbers in Fig. 19.

At the instant when the engine commences to revolve in the reverse direction, all those parts actuated by the shaft C which have independent play will remain free. They will commence to revolve in the reverse direction only when the shaft C has completed a rotation corresponding to the play, and when contact is again made between the actuating and the actuated parts, but on the opposite side. Thus the sleeve D' will move longitudinally along the screw V until it bears with the side $p'$ against the ends of the lever E'. The sleeve D will in its turn move until it bears with the side $p$ against the ends of the lever E or against the ring $x$. Also the tappets $q$ of the shaft C will actuate the disc Q by bearing against the opposite sides of the slots provided in this disc Q for receiving these tappets $q$.

In conclusion, in this gear, notwithstanding the play or lost motion left between the actuating and actuated members of the controlling mechanism (in its extreme end positions), the latter provides a positive drive of the gear during all the time the direction of motion of the engine is not changed. On reversal, owing to the lost motion, the inlet cams, in the first instance, remain stationary in space, (and thus are caused to lag with respect to the reversed motion of the actuating shaft) until the amount of play being overcome, they are caught up again and driven in the reverse direction with a different phase, suitable for the correct operation with the reversed motion.

Similarly, the lost motion between the direct and reversed motion positions of the exhaust cam allows the same, on reversing, to take up the shift suitable for the rearward motion of the engine, while the advance given to the exhaust cam is also such as to prevent the opening of the inlet valve before the exhaust valve is closed.

What I claim is:—

1. Valve gear for elastic fluid engines comprising an actuating shaft driven by the engine, two cams on said shaft both of which are angularly adjustable to take up different positions relative to the shaft, a rocking beam, one end of which is controlled by one cam and the other end by the other cam, the active contour of each cam consisting of two arcs of different radii but with the same centre on the axis of the actuating shaft, with suitable sloping lines connecting said two arcs, a valve which is caused to open when an intermediate point of the rocking beam moves from its central position to one of its extreme positions, but remains closed when said intermediate point moves from said central position to the opposite extreme position, a single controlling shaft adapted to be operated by the engine driver, and to simultaneously control the positions of both cams in such a way that, for forward motion of the engine, the time of opening of the valve varies only with the position of one of the cams, while the time of closing varies only with the position of the second cam, while on the engine reversing its motion, the time of opening of the valve varies only with the position of the second cam, and the time of closing with the position of the first cam.

2. Valve gear for elastic fluid engines having double acting cylinders comprising valve gear as claimed in claim 1, in which the two arcs are each substantially equal to 180° with sufficient shortening to allow for the connecting lines, the one rocking beam being used to operate the two valves, one at each end of the cylinder, which valves are substantially 180° out of phase with each other in their times of opening and closing.

3. Valve gear for elastic fluid engines comprising an actuating shaft driven by the engine, two cams on said shaft both of which are angularly adjustable to take up different positions relative to the shaft, a rocking beam, one end of which is controlled by one cam and the other end by the other cam, the active contour of each cam consisting of two arcs of different radii but with the same centre on the axis of the actuating shaft, with suitable sloping lines connecting said two arcs, a valve which is caused to open when an intermediate point of the rocking beam moves from its central position to one of its extreme positions, but remains closed when said intermediate point moves from said central position to the opposite extreme position, a single controlling shaft adapted to be operated by the engine driver, two cranks fixed on said controlling shaft, each crank being respectively adapted to control the angular position relative to the actuating shaft of one of the cams.

4. Valve gear for elastic fluid engines comprising an actuating shaft driven by the engine, two cams on said shaft both of which are angularly adjustable to take up different positions relative to the shaft, a rocking beam, one end of which is controlled by one cam and the other end by the other cam, the active contour of both cams being identical and consisting of two arcs of different radii but with the same centre on the axis of the actuating shaft, the two arcs being connected by suitable sloping lines, a valve which is caused to open when an intermediate point of the rocking beam moves from its central position to one of its extreme positions, but remains closed when said intermediate point moves from said central position to the opposite extreme position, two sleeves, both having screw threaded connection with the actuating shaft and arranged so that the axial position of each sleeve controls the angular position relative to the actuating shaft of its corresponding cam, movable members controlled by the engine driver and each controlling the axial position of its corresponding sleeve, while play is left between the movable members and the sleeves to allow for different positions of the sleeve corresponding to forward and backward running respectively, and rings on the actuating shaft to limit the extent of axial movement of said sleeves.

5. Valve gear for elastic fluid engines comprising an actuating shaft driven by the engine, two cams on said shaft both of which are angularly adjustable to take up different positions relative to the shaft, a rocking beam, one end of which is controlled by one cam and the other end by the other cam, the active contour of both cams being identical and consisting of two arcs of different radii, but with the same centre on the axis of the actuating shaft, the two arcs being connected by suitable sloping lines, an inlet valve of the engine which is caused to open when an intermediate point of the rocking beam moves from its central position to one of its extreme positions, but remains closed when said intermediate point moves from said central position to the opposite extreme position, an exhaust valve of the engine, a disc loose on the actuating shaft and adapted to actuate the exhaust valve of the engine, two rods each connected to the corresponding inlet cam and passing through slots in the said disc allowing a determined free movement to the rods, the disc being driven sometimes by one rod and sometimes by the other, according to the setting of the valve gear.

6. Valve gear for elastic fluid engines, as claimed in claim 5, comprising two tappets in diametrically opposite positions on the actuating shaft and entering into slots of determined size in the disc which actuates the exhaust valve of the engine, so that the tappets may be adapted to drive the disc in one position for forward travel and another position for backward travel, the said disc being driven sometimes by the tappets and sometimes by the rods connected to the inlet cams, according to the setting of the valve gear.

In testimony whereof I have signed my name to this specification.

ARTURO CAPROTTI.